United States Patent Office 3,148,209
Patented Sept. 8, 1964

3,148,209
2,5-DIPHENYLMERCAPTOTEREPHTHALIC ACID
AND ALKALI METAL SALTS THEREOF
Emil F. Jason and Ellis K. Fields, Chicago, Ill., assignors to Standard Oil Company, Chicago, Ill., a corporation of Indiana
No Drawing. Filed July 19, 1962, Ser. No. 211,109
3 Claims. (Cl. 260—516)

This invention relates to a novel class or aryl thioethers and to their preparation. More particularly, it relates to aryl mercapto-substituted terepthalic acid. The new compositions of this invention can be described generally as the condensation products of an alkali metal salt of an aryl mercaptan and a 2,5-dihaloterephthalate and identified as 2,5-diarylmercaptoterephthalic acid and alkali metal salts thereof. These new compounds are represented by the formula

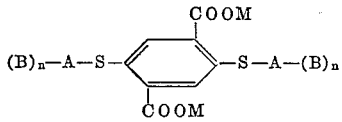

wherein A is an aryl radical; B is a substituent on the aromatic nucleus selected from the group consisting of halo, alkyl, aryl, alkaryl, aralkyl, aryloxy and N,N-dialkylamino radicals, $n$ is 0 to 4; and M is selected from the group consisting of hydrogen and alkali metal.

The diarylmercaptoterephthalic acid derivatives of this invention are obtained by reacting an arylmercaptide having the formula $(B)_n$—A—S—M wherein A, B, $n$ and M are as defined above, with a 2,5-dihaloterephthalate having the formula

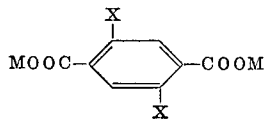

wherein M is an alkali metal and X is a member of the group consisting of chlorine and bromine, in the presence of a catalyst consisting of a finely divided metal selected from the group consisting of copper, zinc, silver, cadmium, lead, tin and mercury.

In the above formulae A represents an unsubstituted or substituted mono- or polynuclear aromatic nucleus of the benzene, naphthalene, anthracene, phenanthrene or other condensed ring series. B represents 1 to 4 substituents on the aromatic nucleus. Such substituents can be selected from the group consisting of the halogens, preferably chlorine or bromine; or alkyl, aryl, alkoxy, aryloxy or N,N-dialkylamino radicals containing from 1 to about 22 carbon atoms, with the proviso that such substituents are not themselves substituted with reactive substituents. The alkali metals represented by M are sodium, potassium, lithium, rubidium, cesium, etc., with sodium and potassium as the preferred metals.

The arylmercaptides represented by the formula

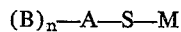

are the alkali metal salts of corresponding arylmercaptans having the formula $(B)_n$—A—S—H. Illustrative aryl mercaptans used in preparing the corresponding aryl mercaptides, and which furnish the arylmercapto moiety $(B)_n$—A—S— in the compounds of this invention, are: phenylmercaptan, tolyl mercaptan, 4-tert-butylphenylmercaptan, 4-octadecylphenylmercaptan, 2,4-dimethylphenylmercaptan, 2,5 - dimethylphenylmercaptan, 2,6-dimethylphenylmercaptan, 3,5-dimethylphenylmercaptan, 2,4,6 - trimethylphenylmercaptan, 2,3,5-trimethylphenylmercaptan, 2,4,5-trioctylphenylmercaptan, 2,3,4,5-tetraethylphenylmercaptan, 3-chlorophenylmercaptan, 4-bromophenylmercaptan, 2,4-dichlorophenylmercaptan, 2,5-dibromophenylmercaptan, 2,4,6-trichlorophenylmercaptan, 4-biphenylmercaptan, 4-benzylphenylmercaptan, 4-(3-phenylhexyl)phenylmercaptan, 4-(4'-propylphenyl)phenyl)phenylmercaptan, 2-methoxy-3,4-dimethylphenylmercaptan, 4-(N,N-dimethylamino)phenylmercaptan, 3-phenoxyphenylmercaptan, naphthylmercaptan, phenanthrylmercaptan, anthrylmercaptan. Illustrative alkali metal salts of 2,5-dihaloterephthalic acid suitable for use in this invention are dipotassium-2,5-dichloroterephthalate, disodium-2,5-dibromoterephthalate and potassium-2(5)-chloro-5(2)-bromoterephthalate.

The reaction between the 2,5-dihaloterephthalate and the aryl mercaptide is a heterogeneous reaction catalyzed by a small amount of a finely divided metal. Consequently, it is advisable to conduct the reaction in an inert liquid medium. The arylmercaptides can be preformed, or formed in situ in the reaction medium. The in situ formation can be effected by reacting an alcoholic solution of the desired arylmercaptan with an appropriate amount of sodium methoxide to obtain the desired quantity of aryl mercaptide and removing the alcohol therefrom, leaving a reaction medium of aryl mercaptan containing the aryl mercaptide. The terephthalate is then added to the reaction medium. The reaction is conveniently carried out at atmospheric pressure and at temperatures from about 150 to 300° C., preferably 180 to 250° C. If desired, the reaction can be conducted at super-atmospheric pressures of from about 15 to about 1000 pounds per square inch. Depending upon the temperature at which the reaction is conducted, the time of reaction may range from about 3 to 72 hours. Copper, zinc, silver, cadmium, lead, tin and mercury are suitable metals for use as catalysts. The amount of finely divided metal used as catalyst is between about 0.1 and 10 weight percent, preferably from 0.1 to 5%, of the reactants.

An illustrative embodiment of this invention is the preparation of dipotassium-2,5-diphenylmercaptoterephthalate, and its conversion to 2,5-diphenylmercaptoterephthalic acid. 10.8 g. (0.2 mole) sodium methoxide was dissolved in 300 ml. methanol. To this solution was slowly added 66 g. (0.6 mole) of phenylmercaptan. Thereafter, the methanol was removed from the reaction mixture by distillation until a temperature of 120° C. was reached. After the methanol was removed, 31.1 g. (0.1 mole) potassium dichloroterephthalate and 1.0 g. of copper powder were added to the phenylmercaptan medium containing the sodiumphenylmercaptide. The resulting mixture, with stirring, was then heated to 200° C. and held at that temperature for 30 hours. Thereafter, the mixture was cooled and sufficient water added to dissolve the salts in the reaction medium formed during the reaction, and produce aqueous and organic phases. The aqueous phase was then separated by filtration and the solids extracted with 10 percent hydroxide. The alkaline filtrate and aqueous phase were combined. Acidification of the aqueous solution with concentrated hydrochloric acid produced pale yellow crystals. Recrystallization from acetic acid gave an acidic product which was identified as 2,5-diphenylmercaptoterephthalic acid having a melting point of 310–312° C. dec., and an acid number of 303 (theoretical 293). Yield ca. 40 mole percent.

*Analysis.*—Calculated for $C_{20}H_{14}S_2O_4$: C, 62.8; H, 3.7; S, 16.7. Found: C, 61.6; H, 3.6; S, 17.3.

The new compositions of matter of this invention are valuable chemical intermediates which can be used in the preparation of polyesters and polyamides. They are also useful as lubricants, plasticizers, and pesticides. The sulfur can be oxidized to form sulfones and sulfoxides. Compounds containing alkyl groups on the aromatic nucleus can be oxidized to carboxy groups and thereby form polycarboxylic acids.

Thus, having described the invention, what is claimed is:
1. A compound of the group consisting of 2,5-diphenylmercaptoterephthalic acid and alkali metal salts thereof.
2. Dipotassium 2,5-diphenylmercaptoterephthalate.
3. 2,5-diphenylmercaptoterephthalic acid.

References Cited in the file of this patent
FOREIGN PATENTS
907,414    Germany _____ Mar. 25, 1954
OTHER REFERENCES
Liebermann et al.: "Chem. Abstracts," vol. 29, page 1423-(5). 1935.